United States Patent Office 2,875,236
Patented Feb. 24, 1959

2,875,236
TRIS (DIISOBUTYLCARBINYL) BORATE

Ernest Levens and Robert M. Washburn, Whittier, Calif., assignors to American Potash & Chemical Corporation, a corporation of Delaware No Drawing. Application January 11, 1956
Serial No. 558,406

1 Claim. (Cl. 260—462)

This invention relates to certain new and useful aliphatic borate esters and, more specifically, to borate esters of those secondary aliphatic alcohols having the generalized formula:

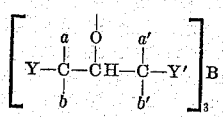

in which the hydrocarbon moieties are bonded to the boron atom through the oxygen atom of the secondary alcohol function. In the formula given, $a$, $b$, $a'$ and $b'$ represent the substituents which may be employed on the alpha carbon atom adjacent to the carbon bearing the esterified secondary alcohol function. These substituents may all be hydrogen, or all or some of them may be radicals of hydrocarbon structure as further defined, and insofar as the secondary alcohol is esterifiable. Y and Y' may include a carbon atom in the beta position with one, two or three substituents, of which at least one is a radical of hydrocarbon structure, as further defined, the remainder being hydrogen or a hydrocarbon radical. Also, Y or Y' may include a nitrogen atom in the beta position with two substituents.

Throughout the specification and claim the term "radical of hydrocarbon structure" includes:

(a) Alkyl radicals, such as methyl, ethyl, normal propyl, isopropyl, and the isomeric butyl radicals;
(b) Aryl radicals, such as phenyl, diphenyl and naphthyl radicals;
(c) Aralkyl radicals, having an aryl group as a substituent in the alkyl chain, such as benzyl and phenylethyl radicals;
(d) Alkaryl radicals, having an alkyl group as a substituent on the aryl group, such as methylphenyl and t-butylphenyl radicals;
(e) Cyclic nonbenzenoid radicals, such as cyclohexyl or other alicyclic radicals.

As is well-known in organic chemistry, a point of asymmetry is obtained when four different groups are attached to carbon and, thus, it is obvious that the borate esters described herein may have one or more asymmetric carbon atoms; we do not wish to be limited to any one of the possible optical isomers.

As examples of the secondary alcohols which may be used to prepare the preferred borate esters of this invention, we include the following, although we do not wish to be limited thereto, they being only illustrative.

(1) 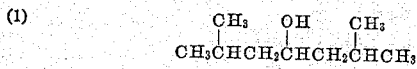

Diisobutylcarbinol [2,6-dimethyl-heptanol-4] is an example of a symmetrical secondary alcohol, where Y and Y' are trisubstituted, each having two methyl groups and a hydrogen atom, while the substituents on the alpha carbon atoms are all hydrogen, that is, $R_1$, $R_2$, $R_1'$, $R_2'$ are methyl, and $R_3$, $R_3'$, $a$, $b$, $a'$, $b'$ are hydrogen.

(2) 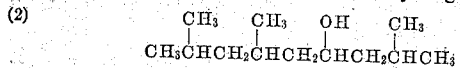

2,6,8-trimethylnonanol-4 is an example of an unsymmetrical secondary alcohol where Y and Y' are trisubstituted, thus: Y and Y' are carbon, $R_1$, $R_1'$ and $R_2'$ are methyl, $R_2$ is isobutyl, and $R_3$, $R_3'$, $a$, $b$, $a'$ and $b'$ are hydrogen.

(3) 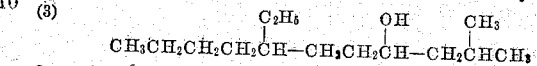

2-methyl-7-ethylundecanol-4 is an example of an unsymmetrical secondary alcohol where: Y and Y' are carbon, $R_2$ is 3-heptyl, $R_1'$ and $R_2'$ are methyl, and $R_1$, $R_3$, $R_3'$, $a$, $b$, $a'$ and $b'$ are hydrogen.

It has been found that the preferred borate esters obtained from certain secondary alcohols may be prepared by well-known procedures which involve the removal of water from a reaction mixture of the appropriate secondary alcohol, and either boric acid, metaboric acid or boric anhydride. The stoichiometry is illustrated in the following equations:

(1) $3(Z)_2CHOH + H_3BO_3 \rightarrow [(Z)_2CHO]_3B + 3H_2O$
(2) $3(Z)_2CHOH + HBO_2 \rightarrow [(Z)_2CHO]_3B + 2H_2O$
(3) $6(Z)_2CHOH + B_2O_3 \rightarrow [(Z)_2CHO]_3B + 3H_2O$ where $(Z)_2CHOH$ represents any of the preferred secondary aliphatic alcohols.

As an example of one of the preparative procedures to which, however, we do not wish to be limited, the water may be removed by azeotropic distillation with a monoolefin, as described in our copending application, Serial No. 439,136, filed June 24, 1954.

*Example 1.—Preparation of tris(2,6,8-trimethyl-4-nonyl) borate*

Tris(2,6,8-trimethyl-4-nonyl) borate was prepared from 2,6,8-trimethyl-nonanol-4 and orthoboric acid by removing water of reaction by azeotropic distillation with benzene.

In a 1,000 ml. three-necked flask fitted with a thermometer, Dean-Stark water trap, and water-cooled condenser, 19.7 g. (0.32 mole) orthoboric acid, 178.0 g. (0.96 mole) 2,6,8-trimethylnonanol-4 and 200 ml. benzene were placed. The mixture was slowly heated for 16.5 hours, and 16.5 ml. water (theory, 17.2 ml.) was collected. The benzene was stripped from the light straw-colored reaction mixture at atmospheric pressure. The remaining material was distilled in vacuo as follows:

(1) 14.3 g., colorless liquid (unreacted alcohol), B. P., 60–68° C./1–2 mm.
(2) 124.0 g. borate ester, colorless mobile oil, B. P., 180–185° C./1–2 mm.
(3) 23.8 g. borate ester, colorless, mobile oil, B. P., 183–187° C./1–2 mm.
(4) 5.9 g. borate ester, colorless, mobile oil, B. P., 187–191° C./1–2 mm.
(5) About 5 ml. light brown liquid remained in the distillation flask.

Fractions (2), (3), and (4) represent a yield of 84.7% tris-(2,6,8-trimethyl-4-nonyl) borate.

*Example 2.—Preparation of tris(2,6,8-trimethyl-4-nonyl) borate*

In a 22-l. flask equipped with a column and an azeotrope separation head, 11,470 g. (61.56 mole) 2,6,8-trimethyl-nonanol-4, 714 g. (10.26 mole) boric anhydride, and 3 liters diisobutylene were heated. The azeotrope separation head permitted the withdrawal of water of reaction while returning diisobutylene to the reaction zone. During eight hours, 535 ml. water was removed. The diisobutylene was removed by distillation at atmospheric pressure, and the remaining material distilled in vacuo:

(1) 9,808 g. borate ester, colorless mobile oil, B. P., 190° C./0.5 mm.

Analysis.—Calculated for $C_{36}H_{75}O_3B$: B, 1.91%. Found: B, 1.88%. $d^{25}{}_4=0.837$ g./ml., $n_D{}^{20°}=1.4382$.

(2) 1,263 g. borate ester (residue) straw-colored mobile liquid.

Analysis.—Found, B, 2.06%.

Fractions (1) and (2) represent a yield of 95.5% of theory.

Example 3.—Preparation of tri(2-methyl-7-ethyl-4-undecyl) borate (a) Tri(2-methyl-7-ethyl-4-undecyl) borate was prepared from 2-methyl-7-ethylundecanol-4 and orthoboric acid by removing water of reaction by azeotropic distillation with benzene.

17.8 g. (0.29 mole) orthoboric acid, 185.5 g. (0.86 mole) 2-methyl-7-ethyl-undecanol-4 and 200 ml. benzene were mixed and heated under gentle reflux in the apparatus described in Example 1. During about 26 hours, 14.0 ml. (theory, 15.6 ml.) water was collected. The resulting clear, light straw-yellow reaction solution was distilled at reduced pressure (water pump) to remove the benzene, and finally as follows:

(1) 4.7 g. colorless alcohol, B. P., 92–150° C./0.5 mm.
(2) 150 g. borate ester, colorless, slightly viscous liquid, B. P., 224–226° C./0.5 mm.
(3) 17.7 g. borate ester, colorless, slightly viscous liquid, B. P., 225–235° C./0.5 mm.
(4) Approximately 1–2 ml. brown liquid left in the distillation flask.

Fraction (2) represents a yield of 81.0% of tri(2-methyl-7-ethyl-4-undecyl) borate.

(b) Tri(2-methyl-7-ethyl-4-undecyl) borate was prepared from 2-methyl-7-ethylundecanol-4 and boric anhydride by removing the water of reaction by azeotropic distillation with diisobutylene.

Two thousand three hundred and sixty-eight grams (11.04 mols) 2-methyl-7-ethylundecanol-4, 128.1 g. (1.84 mols), and 900 ml. diisobutylene were heated under gentle reflux in the equipment described above. Distillation gave 3.64 mols (theory 3.68) colorless, slightly viscous liquid, B. P., 224–226° C./0.6 mm.

Analysis. — Calculated for $C_{42}H_{87}O_3B$: B, 1.66%. Found: B, 1.64%. $d^{26}{}_4=0.846$ g./ml.; $n_D{}^{20.9°}=1.4473$; Cleveland Open Cup flash point, 395° F., Cleveland Open Cup firepoint, 450° F.

Example 4.—Preparation of tri(diisobutylcarbinyl) borate

Tris(diisobutylcarbinyl) borate was prepared from diisobutylcarbinol and boric anhydride by removing the water of reaction by azeotropic distillation with diisobutylene.

Diisobutylcarbinol (386.59 g., 2.68 moles) and boric anhydride (31.13 g., 0.447 mole) were placed in a reaction flask along with glass wool and boiling chips to control bumping; 250 ml. diisobutylene were added through the azeotrope trap. At regular time intervals, the amount of water removed from the reaction was measured. The resulting material was distilled and the following fractions collected:

(1) 180.3 g. diisobutylene, B. P., 102–103° C./760 mm.
(2) 39.3 g. forerun, B. P., 82° C./23 mm., crystallized.
(3) 349.2 g. borate ester, B. P., 152° C./0.3–0.5 mm., crystallized.

Analysis.—Calculated for $C_{27}H_{57}O_3B$: B, 2.46%. Found: B, 2.46 %.

(4) 5.2 g. pot residue, yellow, needle-like crystals.

Fraction (3) represents a yield of 89% of tris(diisobutylcarbinyl) borate.

It is well-known that boron compounds, the borate esters included, when added to gasoline are useful in preventing an increase in the octane requirement of engines using the treated gasoline. Boron compounds are also known to be effective in preventing sludge formation in oils, for improving the extreme pressure characteristics of oils, for increasing lubricity, as antioxidants, for breaking petroleum oil-water emulsions, for preventing the precipitation of wax from petroleum oils treated with a pour-point depressant, and for improving the strength of oil films. Borate esters hitherto described, such as methyl borate, ethyl borate, propyl borate, butyl borate, and the like, are rapidly hydrolyzed on contact with moisture. Their use as additives in petroleum products has, therefore, been impractical because of the water ordinarily found in commercial petroleum products which would be prohibitively expensive to remove. Furthermore, even if the water were removed, it would be impractical to protect the dried petroleum product from the moisture normally found in the ambient atmosphere.

We have found, however, that the preferred aliphatic borate esters prepared from secondary alcohols having substituents on the Y and Y' carbon atoms and which are the object of this invention, can be dissolved in a commercial leaded gasoline containing water and stored for extended periods of time without hydrolysis, as shown by the absence of any precipitate. In contrast, previously known borate esters, when tested in the same way, gave precipitates of boric acid in a relatively short time. Test samples for the study of solubility and resistance to hydrolysis of various borate esters were prepared by dissolving an appropriate amount of each borate ester in a commercial leaded gasoline so as to yield 0.01% boron in solution. This gasoline was found by Karl Fischer titration to contain 0.008% water. The boron-containing gasoline samples were well mixed and transferred to 50 ml. cork-stoppered test tubes. The samples were observed at periods of 4, 8 and 24 hours, one week, one month, and two months for the presence of turbidity or precipitate as indicating hydrolysis and precipitation of boric acid. The results are shown in the following table:

HYDROLYSIS OF BORATE ESTERS IN GASOLINE
[Made up to a content of 0.01% boron in solution]

| No. | Borate Ester | Time for Hydrolysis |
|---|---|---|
| 1 | tri-n-butyl borate | 4 hours. |
| 2 | tri(methylisobutylcarbinyl) borate | Do. |
| 3 | tri-m,p-cresyl borate | Do. |
| 4 | tri-o-cresyl borate | Do. |
| 5 | tri-isopropyl borate | Do. |
| 6 | tri-cyclohexyl borate | Do. |
| 7 | tri(tetrahydrofurfuryl) borate | Do. |
| 8 | tri-2-ethylhexyl borate | 1 week. |
| 9 | tri-n-dodecyl borate | 1 month. |
| 10 | tris(2,6,8-trimethyl-4-nonyl) borate | None after 2 mos. |
| 11 | tri(2-methyl-7-ethyl-4-undecyl) borate | Do. |
| 12 | tris(diisobutylcarbinyl) borate | Do. |

It is apparent that despite the wide variety of borate esters tested, only esters Nos. 10–12 in the table were satisfactory in commercial gasoline.

Besides being useful as a petroleum additive, tri(diisobutylcarbinyl)borate is also useful as a plasticizer, heat exchange fluid, or hydraulic fluid.

We claim:

Tris(diisobutylcarbinyl) borate.

References Cited in the file of this patent

Scattergood et al.: Jour. Amer. Chem. Soc., 67, pp. 2150–52 (1945).